UNITED STATES PATENT OFFICE.

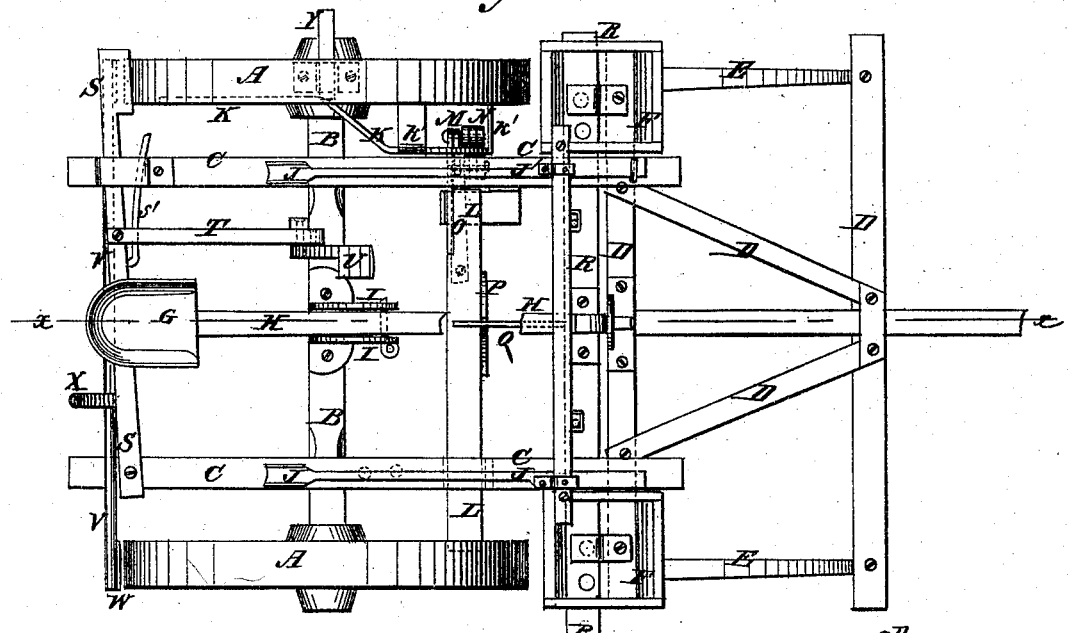
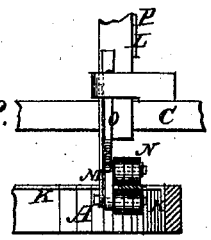
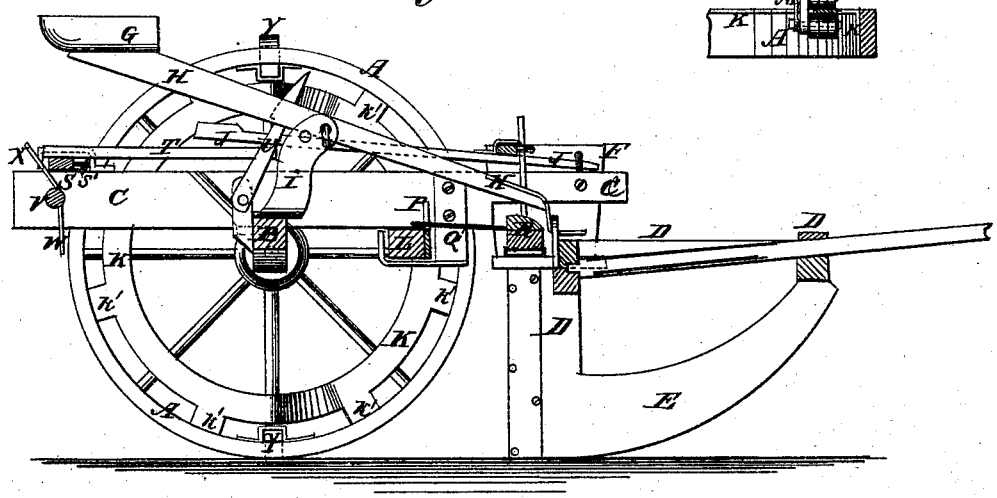

BURTON HAKES AND ELLIS HAKES, OF MARENGO, IOWA.

IMPROVEMENT IN CORN-PLANTERS.

Specification forming part of Letters Patent No. 182,113, dated September 12, 1876; application filed July 11, 1876.

*To all whom it may concern:*

Be it known that we, BURTON HAKES and ELLIS HAKES, of Marengo, in the county of Iowa and State of Iowa, have invented a new and useful Improvement in Corn-Planters, of which the following is a specification:

Figure 1 is a top view of our improved machine. Fig. 2 is a vertical longitudinal section of the same, taken through the line *x x*, Fig. 1. Fig. 3 is a detail view of the guide-rollers.

Similar letters of reference indicate corresponding parts.

The object of this invention is to furnish an improved corn-planter, which shall be so constructed as to drop the seed automatically and at uniform distances as the machine is drawn forward to enable the hills to be planted in accurate check-row, and to throw the dropping mechanism out of gear when the opening-runners are raised from the ground.

The invention consists in the combination of the corn-ring, the pivoted bar, the rollers, and the spring with the wheel, the frame, and the bar, to give a reciprocating movement to said bar; the combination of the notched plate and the spring-arm with the reciprocating bar and the dropping-bar; and in the combination of the detachable and reversible marking-blocks with the rims of the wheels, as hereinafter fully described.

A are the wheels. B is the axle. C is the sulky-frame. D is the dropper-frame. E are the opening-runners. F are the seed-hoppers. G is the seat. H is the seat-lever. I is the seat-lever standard, and J are the foot-levers, about the construction of all of which parts there is nothing new. K is a ring, upon the outer edge of which are formed, or to it are attached, arms *k'*, the ends of which are attached to the rim or spokes of the wheel A. The ring K is made with inclined offsets upon its opposite sides, so that one half of said ring may be nearer the wheel A than the other half, to adapt the ring to serve as a cam to give a reciprocating movement to the bar L. The bar L slides in keepers attached to the side bars of the frame C, and to its end next the cam-ring K, or to an arm attached to said end, is pivoted the outer end of a short bar, M, to the ends of which are pivoted rollers N, at such a distance apart as to receive the ring K between them, and to roll along the opposite sides of the said ring. The bar M and rollers N are held in line with the bar L by a spring, O, attached to the said bar L, and the free end of which rests against the end of the bar L. This construction keeps the bar M in line with the bar L while the rollers N are passing along the straight parts of the cam-ring K, and allows the bar M to stand at an angle with the bar L while the rollers N are passing along the inclines of the said cam-ring K, so that said rollers cannot bend or stick upon the ring.

To the middle part of the sliding bar L is attached a plate, P, which projects above the said bar, and has a deep notch or slot formed in its middle part to receive a spring-arm, Q, the end of which is attached to the dropping-slide R, by which the seed is removed from the hoppers F. The upper edge of the plate P is beveled or inclined from its middle part toward its ends, so that the spring-arm Q can slide up the said edge into its notch automatically. By this construction, when the runners E are raised from the ground the spring-arm Q will be raised out of the notch in the plate P, and the dropping-slide will no longer be operated. When the runners E are again dropped to the ground the spring-arm Q will enter the notch of the plate P, and the dropping-slide R will be again operated to drop the seed.

S is a brake-bar, the shoe of which rests against the rim of the wheel A, that carries the cam-ring K. The other end of the brake-bar S is pivoted to the rear end of the farther side bar of the frame C. To the brake-bar S is pivoted the rear end of the connecting-rod T, the forward end of which is pivoted to the lever U. The lower end of the lever U is pivoted to the axle B, or to a support attached to said axle, and its upper end projects into such a position that it may be conveniently reached and operated by the driver with his foot. The brake S T V enables the driver to stop the revolution of the wheel A when starting in at the side of the field, so that the machine may be adjusted to plant the hills in check-row by drawing the said machine forward.

The brake is withdrawn from the wheel when the pressure is withdrawn from the lever U, by a spring, $s'$, attached to the brake-bar S, and which rests against the keeper in which said brake-bar works. V is a shaft that works in bearings in the rear ends of the side bars of the frame C, and to its end parts are attached plates W, which, when turned against the rims of the wheels A, act as scrapers to scrape off any soil that may adhere to said wheels. To the shaft V is attached a short foot-lever, X, so that the driver can operate the said shaft with his foot to apply the scrapers. Y are blocks, the shanks of which are passed through keepers attached to the concave sides of the rims of the wheels, and the outer parts of which are so formed as to be flush with or project a little beyond the convex side of said rims, so as to come in contact with and mark the ground opposite each hill, to serve as a guide for the driver to enable him to plant the field in accurate check-row.

When not required for use, the marking-blocks Y may be taken out and reversed, which will prevent them from coming in contact with the soil.

Having thus described our invention, we claim as new and desire to secure by Letters Patent—

1. The combination of the cam-ring K, the pivoted bar M, the rollers N, and the spring O with the wheel A, the frame C, and the bar L, to give a reciprocating movement to said bar L, substantially as herein shown and described.

2. The combination of the notched plate P and the spring-arm Q with the reciprocating bar L and the dropping-bar R, substantially as herein shown and described.

3. The combination of the detachable and reversible marking-blocks Y with the rims of the wheel A, substantially as herein shown and described.

BURTON HAKES.
ELLIS HAKES.

Witnesses:
JAMES H. FEENAN,
JNO. HUGHES, Jr.